United States Patent [19]
Liu

[11] 3,994,078
[45] Nov. 30, 1976

[54] EDUCATIONAL TOY CLOCK WITH ACTION

[76] Inventor: Hsing-Ching Liu, 3F, No. 213, Sec. 4, Chung-Ching North Road, Taipei, China /Taiwan

[22] Filed: Mar. 13, 1975

[21] Appl. No.: 557,956

[52] U.S. Cl. .................................. 35/39; 35/9 B
[51] Int. Cl.² ........................................ G09B 19/12
[58] Field of Search ............ 35/9 R, 9 B, 9 C, 9 D, 35/39, 71, 73; 58/126 D

[56] References Cited
UNITED STATES PATENTS

| | | | |
|---|---|---|---|
| 1,085,405 | 1/1914 | Dadd | 35/71 |
| 1,686,105 | 10/1928 | Rothenberg | 35/9 B |
| 1,735,456 | 11/1929 | Garman | 35/73 X |
| 2,539,077 | 1/1951 | Hawkins | 35/9 D X |
| 2,545,381 | 3/1951 | Prentice | 35/9 B |
| 3,362,103 | 1/1968 | Neumann | 35/9 R X |
| 3,608,207 | 9/1971 | Bissell | 35/9 B |

FOREIGN PATENTS OR APPLICATIONS

| | | | |
|---|---|---|---|
| 9,713 | 3/1895 | Switzerland | 58/126 D |

Primary Examiner—William H. Grieb
Attorney, Agent, or Firm—Burns, Doane, Swecker & Mathis

[57] ABSTRACT

An educational toy comprises a base and a statue mounted thereon. The statue has movable head and arms. A pair of hands are relatively rotatable about a dial face of a question/answer plate. To each hand is connected a switchboard having a plurality of contacts. Contacts of one switchboard are electrically coupled to contacts of the other switchboard. A first actuating mechanism, including a first drive motor, is coupled to the head and arms of the statue. A second actuating mechanism, including a second drive motor, is connected to the head of the statue. A disc is disposed over the switchboards and includes first and second circuit systems. When the hands are positioned to indicate a question and corresponding answer, electrical contacts on the switchboards contact appropriate contacts on the disc to close the first circuit and thereby actuate the first drive motor to produce an affirmative nodding and clapping action of the statue. If an incorrect answer is indicated, then contacts on the switchboards contact appropriate contacts on the disc to close the second circuit system and thereby activate the second drive motor to produce a negative wagging motion of the statue head.

3 Claims, 9 Drawing Figures

EDUCATIONAL TOY CLOCK WITH ACTION

The present invention relates generally to an educational toy and more particularly to a clock type of selective quiz and answer toy.

The applicant filed a U.S. Patent Application under Ser. No. 457,172 on Apr. 2, 1974, entitled "Educational Quiz and Answer Toy with Action," U.S. Pat. No. 3,902,256, issued Sept. 2, 1975. The said application provides an educational quiz and answer toy comprising a base portion, an active statue portion mounted on the base, a compartment for receiving a quiz plate, a compartment for receiving an answer plate, and electrical connections implanted in both the cavity and plates. The toy is arranged such that when a correct answer plate is inserted to match a corresponding quiz plate, the circuit is closed to move a motor actuated crank mechanism within the statue to cause the statue to nod its head and clap.

The present invention is a further improvement of said patented application characterized by utilizing a replaceable unitary clock face plate, wherein one plate carrying a plurality of questions and corresponding answers is pre-formed, instead of individual quiz and answer plates.

Actually, the clock type of educational toy has been known in the art, such as shown in the U.S. Pat. No. 3,362,103 in the name of Arthur E. Neumann, which comprises a frame structure including means defining a clock face having a plurality of openings and number elements adapted to be inserted in the openings. Also mounted on the frame structure is a figure having a movable head portion, with such head portion being connected to mechanism underlying the face of the clock. As the number elements are inserted in the openings in the clock face, the figure head portion nods "affirmatively" or "negatively" to indicate whether the number has been correctly positioned on the clock face.

But in the said patent, there are only a mechanical action. It is believed that it lacks something in the amount of satisfaction offered to the children.

Therefore, it is the primary object of this invention to provide a novel form of educational toy clock mainly comprising a base, an active statue mounted on the base, a series of replaceable quiz-and-answer plates, an electrical conducting disc, a couple of fingers and corresponding switch boards, a plurality of driving means and the relevant mechanism, and a couple of signal circuits, which characterized by the fact that when a correct answer is made by turning the fingers above the quiz and answer plate, a circuit is closed to move a driving means for actuating first mechanism within the statue to indicate approval by nodding and simultaneously clapping. On the other hand, when a wrong answer is made, a circuit is otherwise closed to move another driving means for actuating second mechanism within the same statue to indicate disapproval by wagging the head.

Other objects and advantages will become apparent from the following description with reference to the accompanying drawings, in which.

Figure 1:
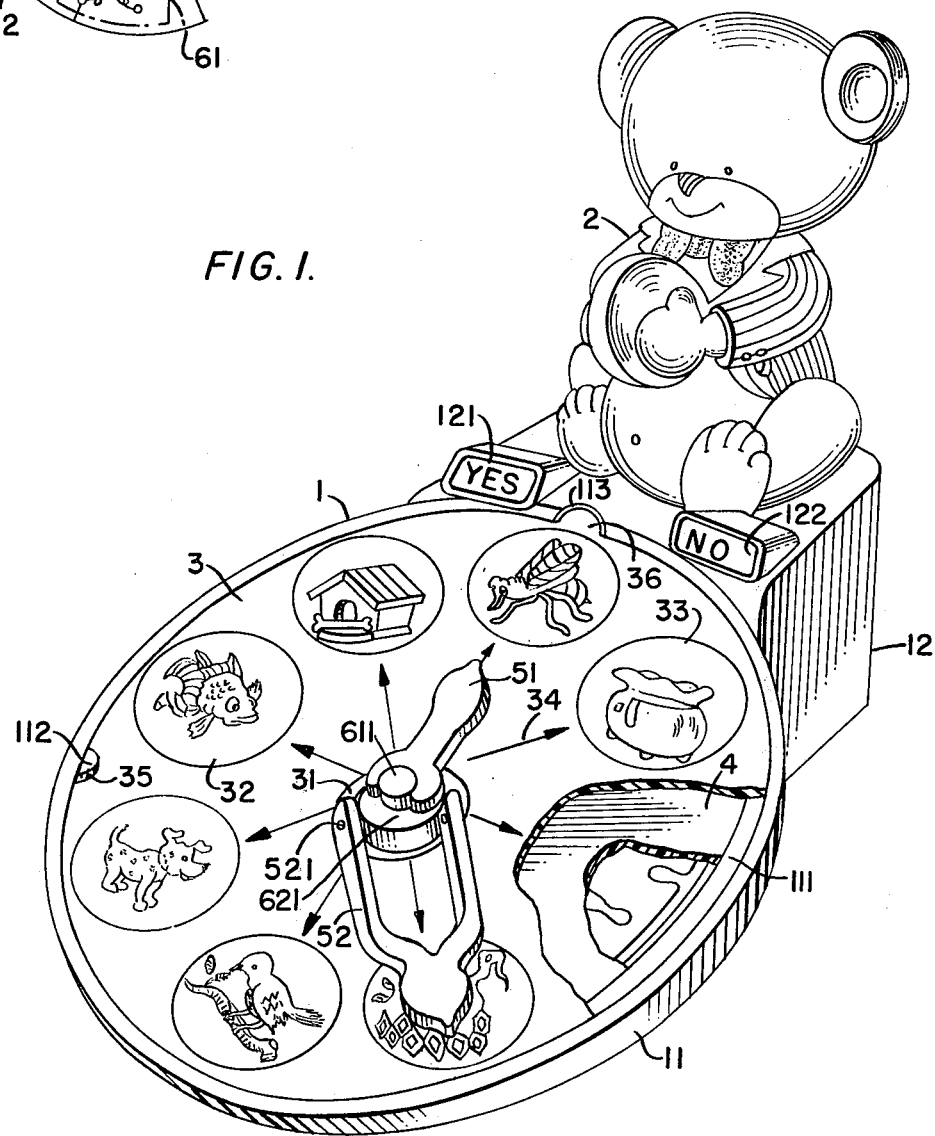
FIG. 1 is a perspective view of a preferred embodiment of the present invention, with parts broken away.

Now, with reference to FIG. 1, the base 1 consists of a clock base portion 11 and a statue base portion 12. The statue 2 is integrally mounted on the said base portion 12. The quiz and answer plate 3 with a central hole 31 is printed with a plurality of relative question indicia 32 and answer indicia 33 in the form of illustration, character, mathematical calculation etc.. This plate 3 can be of various kinds of expression with unlimited pieces for replacement in order to give a desirable educational effect depending upon the knowledge level of children. The circular electrical conducting disc 4 is arranged under the quiz and answer plate 3. A couple of fingers or hands 51 and 52 are pivotably fixed on the shaft 611 and sleeve 621, respectively, by means of pins 511 and 521. A circular retention seat 111 is provided inwardly along the inner periphery of the base portion 12 at a certain distance from the surface of the same, for receiving the said plate 3.

A protrude setting means 112 on the disc 4 and a recess setting means 113 in the base portion 11 are also provided, in which the recess setting means 113 is formed at a fixed position along the inner periphery of base portion 11 for setting the plate 3, by positioning the protrude 36 of the plate 3 to match the said corresponding means 113. The protrude setting means 112 is formed at the edge of the said disc 4 (See FIG. 3). This means 112 can be rotated by hand, to be correspondingly positioned relative to the recess 35 of the plate 3 and to match up therewith. Under this circumstance, the disc 4 is rotated along with the said means 112. The position of recess 35 respective to the protrude 36 is varied piece by piece, so that the disc 4 should be rotated either clockwise or counter-clockwise depending on different plates 3 in order to prevent the fixed response of children.

Behind the indicating windows 121 and 122, there are provided signal lamps $S_1$ and $S_2$, respectively (See FIGS. 2 & 5), to show that the selected answer is correct or wrong by light as well as the words, such as "Yes" or "No," designated on the said windows 121 and 122. Further, a plurality of arrows 34 directed to each question 32 or answer 33 are inscribed on the plate 3 for indication that the fingers 51, 52 are at exact position.

Figure 2:
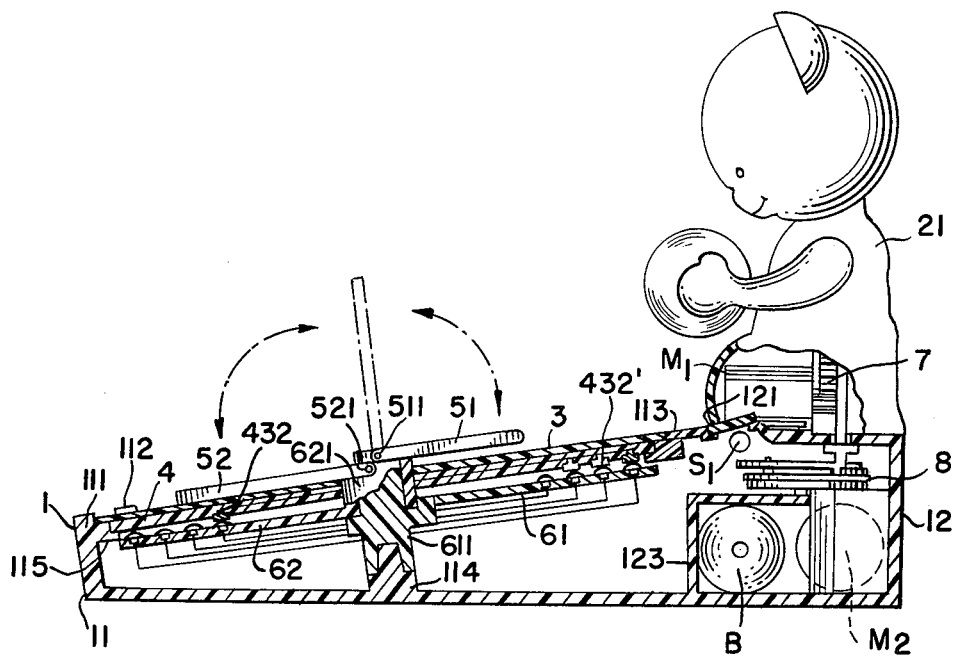
FIG. 2 is a sectional side view of FIG. 1, with parts broken away.

FIG. 2 shows the inner construction of the base 1. At the center of the clock, base portion 11 is provided with an erected spindle 114. The shaft 611 of the switch board 61 is rotatably placed on the spindle 114, and the sleeve 621 of another switch board 62 is in turn rotatably placed outside of the said shaft 611. The electrical conducting disc 4, by means of its central hole 41 through the sleeve 621, is placed on the retention means 115 formed at the lower end of the said retention means 111, to cover the switch boards 61 and 62. Further, above the disc 4 is disposed with the quiz and answer plate 3, which is in the same manner, i.e., by means of its central hole 31 through sleeve 621, placed on the retention member 111. Then the short finger 51 and long finger 52, as mentioned above, are rotatably fixed on the shaft 611 and sleeve 621, respectively, by means of the pins 511, 521 and can turn around the plate 3 individually. The couple of fingers 51, 52 may be pivotably erected in the direction of arrows (FIG. 2) to an extent as shown by the dotted line, in order for replacement of the plate 3 through it.

A first mechanism 7 is arranged within the statue body 21, while a second mechanism 8 is arranged thereunder, as will be described in detail hereafter. At the statue base portion 12 is a battery chamber 123 for receiving the battery B as power source. $M_1$ and $M_2$ represent, respectively, motors constituting driving means for actuating the said mechanisms 7 and 8. $S_1$ and $S_2$ ($S_2$ not shown in FIG. 2) represent, respectively, signal lamps placed behind the windows 121, 122, as mentioned above.

Figure 3:
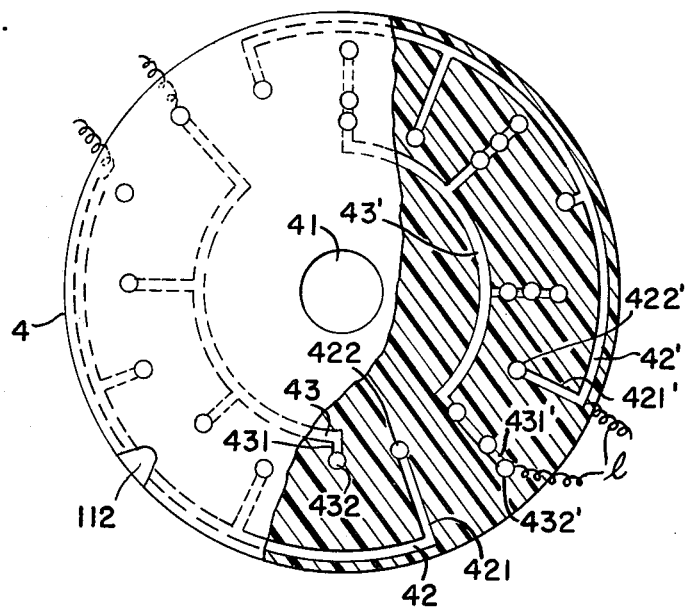
FIG. 3 is a plan view of electrical conducting disc, with parts broken away.

FIG. 3 shows an embodiment of the electrical conducting disc 4. At the under surface of the disc 4, it is formed with an outer conducting pair 42, 42' and an inner conducting pair 43, 43', each composed of two disconnected half circles, which are made by printed circuit or other way for suitable use. The outer conducting pair 42, 42' is denoted, for example, as "affirmative" conducting pair, while the inner conducting pair 43, 43' as "negative" one. Each pair extends several branches 421, 421', 431, 431', etc. in which the branches 421, 421' and 431 each at its end posseses an electrical contact 422, 422' and 432 raised or protruded downwardly. Except that the branch 431' is provided with, for example, three in-line contacts 432'. The lead wire will connect the conducting pair 42 42' and 43, 43' to the power source, namely, the battery B. Since the disc 4 is rotatably mounted on the sleeve 621 for about 90° rotation angle by operating the protrude setting means 112 attached thereon, the wire length should be long enough for this purpose.

Figure 4:
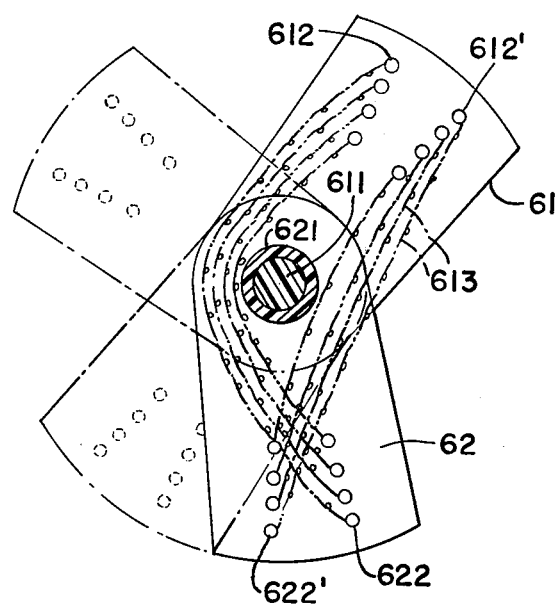
FIG. 4 is a plan view of switch board.

FIG. 4 shows that the switch boards 61 and 62 are each provided with two radial rows of electrical contacts 612, 612' and 622, 622', respectively, which will be connected with the contacts 422, 422' and 423, 423' on the conducting disc 4. Under the board 61, 62 there are wires 613 for connecting between the contacts 612 and 622 as well as between the contacts 612 and 622'. Any one of the switch board 61 or 62 is possible for rotation in the range from 0° to about 140° in respective to another board 62 or 61, that is from an overlapping of the two boards 61, 62 to a wide-spread condition. When over 140°, the two boards 61 and 62 should be rotated together. The said wires 613 should be of enough length for this purpose.

Figure 5:
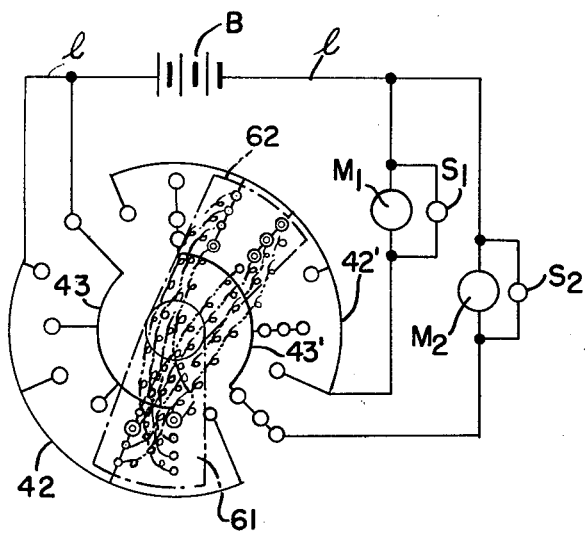
FIG. 5 is an electrical circuit embodiment of the present invention.

FIG. 5 shows an embodiment of the circuit. The positive side of the battery B is connected to conducting members 42, 43 through lead wire $l$, while the negative side thereof is connected to a first circuit system consisting of miniature motor $M_1$, lamp $S_1$ and conducting member 42' for affirmative indication, as well as connected in parallel to a second circuit system consisting of miniature motor $M_2$, lamp $S_2$ and conducting member 43'.

Figure 8:
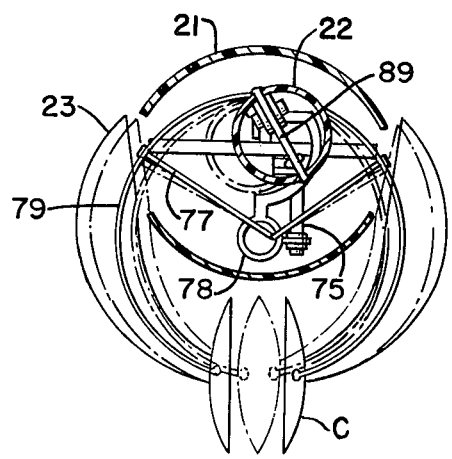
FIG. 8 is a top view of the mechanism with the head of the statue cut off.
Figure 6:
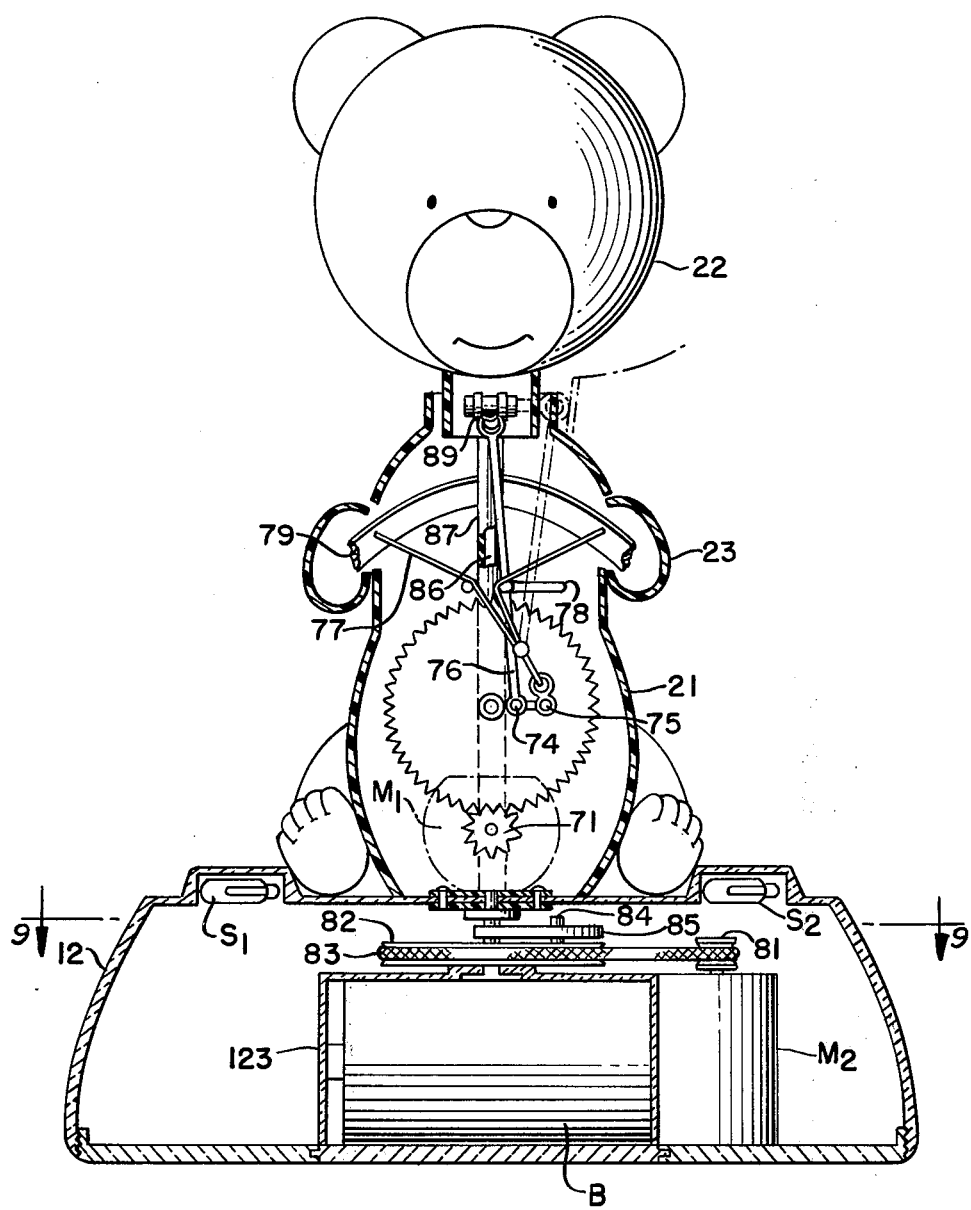
FIG. 6 is a sectional front view of the active statue, with parts broken away.
Figure 7:
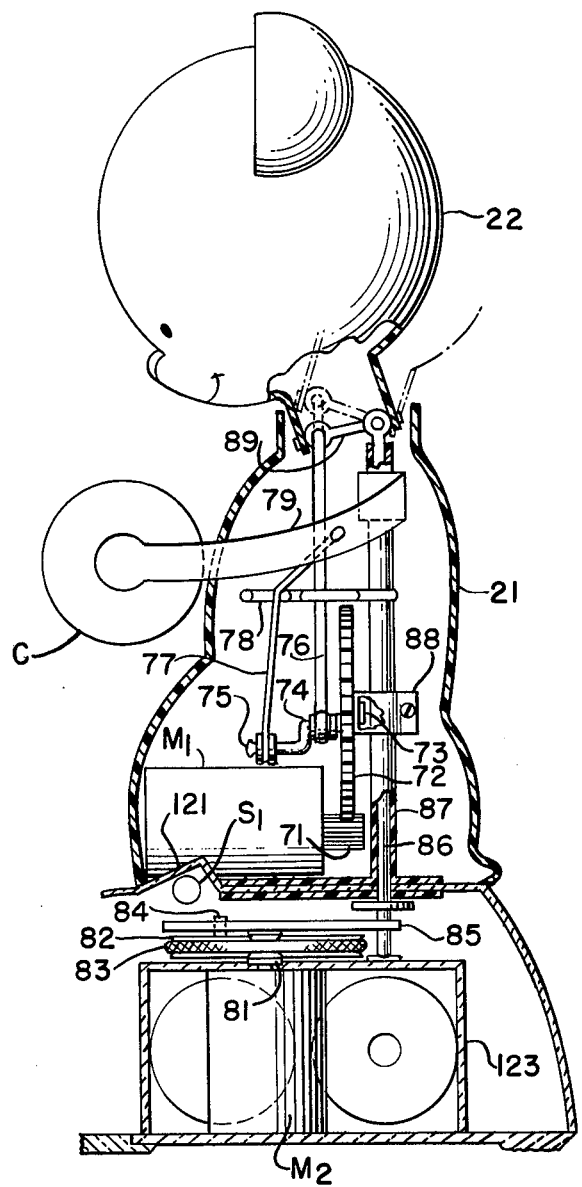
FIG. 7 is a sectional side view of the statue, with parts broken away.

As shown in FIGS. 6, 7 & 8, the first actuating mechanism 7, arranged inside of the statue body 21, consists of a smaller gear 71 driven by the motor $M_1$, a greater gear 72 matched with the smaller gear 71, an eccentric crankshaft of two sections 74 and 75, a link 76 connected to the section 74 of crankshaft at one end and to the neck portion of the statue head 22 at another end, and a belt 77 connected to the section 75 of crankshaft at one end through a ring 78 to both ends of a resilient arm plate 79 at another end. The arm plate 79 along and within the hands 23 of the statue. A pair of cymbals C is held in the hands 23.

The second actuating mechanism 8, arranged inside of the statue base portion 12, consists of a smaller pulley 81 driven by the motor $M_2$, and a large pulley 82. Transmission therebetween is provided by means of a belt 83, a guide pin 84 protruded from the larger pulley 82 at an eccentric position, a vibrating or oscillating means 85 with longitudinal slot, through which slot the said pin 84 is, and a rod 86 extended upwardly from the upper wall of battery chamber 123 to the neck portion of the statue head 22 through a tube 87. The upper end of the rod 86 is connected to the upper end of said link 76 by means of a short link 89. And the said greater gear 72 is supported on the tube 87 by means of a clamp 88 which is mounted on a connecting member 73 provided on said gear 72.

With the constructions mentioned above, the present invention can be operated, first of all, by erecting the fingers 51, 52 vertically in perpendicular relation to the clock face, and then passing the central hole 31 of a selected quiz and answer plate 3 through the said fingers 51, 52 and placed on the clock base portion 11. Next place the protrude 36 to match the recess setting means 113, and turn the protrude setting means 112 to meet the recess 35 on the plate 3. Then let the fingers 51, 52 return to horizontal status. The preparation has been thus finished, as shown in FIG. 1.

Now, rotate for example the finger 51 to coincide the arrow 34 directed to the illustration of "Bee", and let the children select the answer from other illustrations on the same plate 3. If the child rotates the long finger 52 to coincide with the arrow 34 directed to the illustration of "Beehive", then he makes an answer correct. At this moment, the switch boards 61, 62 are also rotated together with the fingers 51, 52 and stay at the position corresponding to the location of the fingers 51, 52. In this case, as shown in FIG. 5, since the connection takes place between the electrical contacts 42 and 42', the circuit system consisting of battery B → contact 42 → switch boards 61, 62 → contact 42' → <lamp $S_1$ motor $M_1$> → battery B is closed. Thus the signal behind the window 121 marked with "Yes" is lit. At the same time, the driven motor $M_1$ actuates the first mechanism 7 to indicate approval by nodding and clapping through action of crankshaft sections 74, 75, as shown in FIGS. 7 & 8.

On the other hand, if the children rotate the finger 52 to make a wrong answer, then the connection takes place between the contacts 43 and 43', so that the circuit system consisting of
battery B → contact 43 → switch board 61, 62 → contact 43' → < motor $M_2$ / lamp $S_2$ > → battery B is closed.

Figure 9:
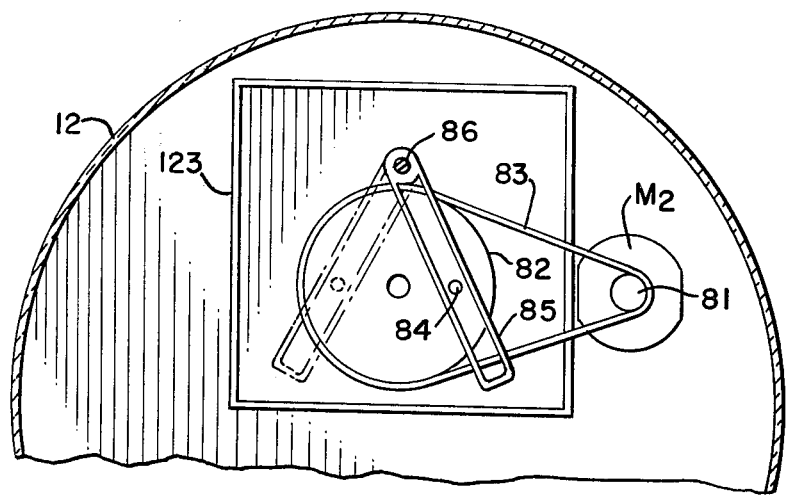
FIG. 9 is a cross sectional view taken along the line 9 — 9 in FIG. 6.

Thus the signal behind the window 122 marked with "No" is lit. At the same time, the driven motor $M_2$ actuates the second mechanism 8 to indicate disapproval by wagging the head through the action of vibrating means 85, rod 86 and link 89, as shown in FIGS. 6, 8 & 9.

As mentioned above, it is seen that the present invention provides a novel and educational toy in the form of clock, and with action, signal and words simultaneously to indicate the answer is correct or wrong, so as to increase the interest in learning and the result achieved.

The above embodiments are given only for illustrative purposes and not by the way of limitation. Any variations and modifications evident to those skilled in the art will fall within the scope of the attached claims.

What I claim is:

1. An educational toy comprising:
    a base comprising a clock base portion and a statue base portion, the said clock base portion being provided with a spindle at about the center thereof;
    an active statue mounted on said statue base portion, said statue having a movable head portion and two resilient arms;
    a pair of indicating clock hands;
    a pair of switch boards connected to respective ones of said hands for movement therewith; one of the said switch boards having a central shaft supported on the said spindle of said clock base portion and the other switch board having a central sleeve placed over the said shaft so that one hand and associated switch board are rotatable relative to the other hand and associated switch board, each switch board being provided with at least two radial rows of upwardly raised electrical contacts and a plurality of wires interconnecting the contacts of one switch board with the contacts of the other switch board;
    a first actuating mechanism, including a first drive motor, connected to said head portion and to said resilient arms for producing a nodding motion of said head portion and a clapping motion of said arms upon activation of said first drive motor;
    a second actuating mechanism including a second drive motor, connected to said head portion for producing a to-and-fro wagging motion of said head portion upon activation of said second drive motor;
    an electrical power source connected to said first and second circuit systems;
    an electrical conducting disc placed over said switch boards by inserting a hole at the center of said disc through said sleeve, said disc including a first circuit system comprising an outer pair of conductors, and a second circuit system comprising an inner pair of conductors, each pair of conductors comprising two disconnected generally-half circles formed by printed circuits and a plurality of branch lines branching from said half circles, each branch line being provided with at least one downwardly protruded electrical contact;
    a first of said circuit systems being coupled to said first drive motor, and a second of said circuit systems being coupled to said second drive motor;
    said downwardly protruded contacts being engageable with said upwardly raised contacts of said switch boards for closing one or the other of said first and second circuit systems, depending upon the relative positions of said hands;
    a series of replaceable question-and-answer plates selectively mountable over said disc, each plate having indicia thereon representing a question and related indicia representing an answer. said indicia being arranged so as to be indicated by said hands, such that when one of said hands indicates a question and the other hand indicates a corresponding correct answer, upwardly raised contacts on said switch boards contact downwardly protruded contacts of said first circuit system to close only said first circuit system, causing said head portion to nod and said arms to clap, and when said other hand indicates an incorrect answer, upwardly raised contacts on said switch boards contact downwardly protruded contacts of said second circuit to close only said second circuit, causing said head portion to wag to-and-fro.

2. A toy according to claim 1 wherein said first actuating mechanism is arranged within said statue, and comprises a first gear driven by said first motor, a second, larger gear driven by said first gear, an eccentric crankshaft driven by said second gear and having first and second eccentrically offset portions, a link connected to the first of said crankshaft portions and to said head portion of said statue to produce said nodding motion of said head portion when said second gear rotates, a guide ring, and a belt connected to said second crankshaft portion and to both of said resilient arms and passing through said ring producing the clapping motion of said arms when said second gear is rotated.

3. A toy according to claim 2 wherein said second actuating mechanism is arranged within said statue base portion and comprises a first pulley driven by said second motor, a second, larger pulley, an endless drive belt drivingly connected therebetween, a pin protruding eccentrically from said second pulley, an oscillator member mounted for rotary movement and having a slot receiving said pin, a rod connected to said oscillator member and extending upwardly toward the head portion of said statue, and an intermediate link element connected between said rod and the top of said link of said first actuating mechanism to produce the wagging motion of the head when said second pulley is rotated.

* * * * *